United States Patent
Lee

(10) Patent No.: US 11,962,196 B2
(45) Date of Patent: Apr. 16, 2024

(54) ROTOR FOR MOTOR AND MOTOR COMPRISING SAME

(71) Applicant: HYUNDAI KEFICO CORPORATION, Gyeonggi-do (KR)

(72) Inventor: Ahn Hee Lee, Gyeonggi-do (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 399 days.

(21) Appl. No.: 17/312,298

(22) PCT Filed: Apr. 28, 2020

(86) PCT No.: PCT/KR2020/005587
§ 371 (c)(1),
(2) Date: Jun. 9, 2021

(87) PCT Pub. No.: WO2020/226323
PCT Pub. Date: Nov. 12, 2020

(65) Prior Publication Data
US 2022/0109340 A1    Apr. 7, 2022

(30) Foreign Application Priority Data

May 3, 2019    (KR) .......................... 10-2019-0052427

(51) Int. Cl.
| | | |
|---|---|---|
| *H02K 1/28* | (2006.01) | |
| *H02K 1/278* | (2022.01) | |
| *H02K 21/14* | (2006.01) | |

(52) U.S. Cl.
CPC ............... *H02K 1/28* (2013.01); *H02K 1/278* (2013.01); *H02K 21/14* (2013.01)

(58) Field of Classification Search
CPC ........... H02K 1/28; H02K 1/278; H02K 21/14
See application file for complete search history.

(56) References Cited

U.S. PATENT DOCUMENTS

2018/0356107 A1* 12/2018 Lee ...................... F24F 1/0022

FOREIGN PATENT DOCUMENTS

| JP | 2004312876 A | * 11/2004 |
| JP | 2008079377 A | *  4/2008 |
| KR | 2017-0140715 A |  12/2017 |

OTHER PUBLICATIONS

JP-2008079377-A_translate (Year: 2008).*
JP-2004312876-A_translate (Year: 2004).*

* cited by examiner

*Primary Examiner* — Tulsidas C Patel
*Assistant Examiner* — Mohammed Ahmed Qureshi
(74) *Attorney, Agent, or Firm* — Fox Rothschild LLP

(57) ABSTRACT

A rotor for a motor is proposed, the rotor including: a magnet coupled to a shaft to surround an outer surface of the shaft and having opposite-polar magnetic portions circumferentially alternately arranged; a first fixed ring fixed to the shaft to surround an outer surface of the shaft, disposed in contact with an upper portion of the magnet, and having a first coupling portion at a lower end being in contact with a top of the magnet to prevent rotation relative to the magnet; and a second fixed ring fixed to the shaft to surround the outer surface of the shaft, disposed in contact with a lower portion of the magnet, and having a second coupling portion at an upper end being in contact with a bottom of the magnet to prevent rotation relative to the magnet.

13 Claims, 8 Drawing Sheets

ROTOR FOR MOTOR AND MOTOR COMPRISING SAME

CROSS-REFERENCE TO RELATED APPLICATION

This application is a National Phase application filed under 35 USC 371 of PCT International Application No. PCT/KR2020/005587, with an International Filing Date of Apr. 28, 2020, which claims priority to Korean Patent Application No. 10-2019-0052427, filed on May 3, 2019, the entire contents of which are incorporated herein by reference.

TECHNICAL FIELD

The present invention relates to a rotor for a motor and a motor including the rotor, particularly, to a structure in which a magnet included in the rotor of a motor is coupled to a shaft, and a motor including the structure.

BACKGROUND ART

In a BLDC motor, a permanent magnet is the rotor and a coil (electromagnet) arrangement is the stator. A current flows between opposite coils. The N-pole and S-pole are formed while a current flows in the same direction between opposite coils. The N-pole and S-pole of the rotor are attracted by the stator, and the stator forms an opposite magnetic field, thereby repulsing the rotor. Since the coils are connected to each other, it is possible to enable a current to more efficiently flow by applying a current to only one coil.

Several projector methods are applied to BLDC motors to assemble the magnet included in the rotor in the related art. For example, the magnet included in a rotor is protected and prevented from separating by a molding, a can, a tube, or the like. In particular, a magnet is coupled by coupling a cup-shaped can to the outer side of the magnet using an adhesive.

However, since a can is disposed on the outer side of a magnet, the magnetic gap between the rotor and the stator is increased by the thickness of the can, so there is a problem that the torque of the motor is decreased. Further, since a part that is the can is added, there is a problem that the working processes are increased and the manufacturing cost is also increased.

The description provided above as a related art of the present invention is just for helping understanding the background of the present invention and should not be construed as being included in the related art known by those skilled in the art.

DISCLOSURE

Technical Problem

The present invention has been made in an effort to solve the problems and an objective of the present invention is to provide a rotor for a motor in which a magnet is fixed to a shaft and protected without a can, and a motor including the rotor.

Technical Solution

In order to achieve the objectives of the present invention, a rotor for a motor includes: a magnet coupled to a shaft to surround an outer surface of the shaft and having opposite-polar magnetic portions circumferentially alternately arranged; a first fixed ring fixed to the shaft to surround an outer surface of the shaft, disposed in contact with an upper portion of the magnet, and having a first coupling portion at a lower end being in contact with a top of the magnet to prevent rotation relative to the magnet; and a second fixed ring fixed to the shaft to surround the outer surface of the shaft, disposed in contact with a lower portion of the magnet, and having a second coupling portion at an upper end being in contact with a bottom of the magnet to prevent rotation relative to the magnet.

The first coupling portion or the second coupling portion may protrude toward the magnet or may be recessed inside the first fixed ring or the second fixed ring, and a first locking portion or a second locking portion recessed or protruding to correspond to a shape of the first coupling portion or the second coupling portion and locked to the first coupling portion or the second coupling portion may be formed at an upper end or a lower end of the magnet.

The first coupling portion and the first locking portion or the second coupling portion and the second locking portion may be formed as curved surfaces connected such that an inclination is continuously changed.

The first coupling portion and the second coupling portion may be formed to correspond to the numbers of opposite-polar magnetic portions of the magnet, respectively, and may be circumferentially alternately arranged.

A boundary between the opposite-polar magnetic portions may be positioned between the first coupling portion and the second coupling portion.

The first coupling portion and the second coupling portion may be formed at centers of the opposite-polar magnetic portions, respectively.

A protrusion protruding from the first fixed ring or the second fixed ring and a support recessed inside the first fixed ring or the second fixed ring may be alternately disposed at each of the first coupling portion and the second coupling portion, the protrusion of the first coupling portion may be positioned to circumferentially correspond to the support of the second coupling portion, and the support of the first coupling portion may be positioned to circumferentially correspond to the protrusion of the second coupling portion.

A first locking portion and a second locking portion respectively corresponding to the first coupling portion and the second coupling portion may be formed at an upper end or a lower end of the magnet, and a height of the magnet may be circumferentially maintained at a predetermined level.

Inner diameters of the first fixed ring and the second fixed ring may be the same as or smaller than an outer diameter of the shaft, and the first fixed ring and the second fixed ring may be forcibly fitted on the shaft.

An inner diameter of the magnet may be the same as or larger than an outer diameter of the shaft, and a shaft may pass through the magnet.

The first fixed ring and the second fixed ring may be made of a material having the same density as the magnet.

The first coupling portion or the second coupling portion may be formed by connecting a plurality of spaced protrusions protruding toward the magnet or a plurality supports recessed inside the first fixed ring or the second fixed ring.

In order to achieve the objectives of a present invention, a motor including the rotor for a motor further includes: an intermediate housing spaced apart from the magnet and surrounding an outer side of the magnet; an upper housing covering an upper portion of the intermediate housing and coupled to the intermediate housing; a lower housing disposed outside the intermediate housing, surrounding the intermediate housing to form an internal space therebetween, and coupled to the intermediate housing or the upper housing; and a stator disposed in the space between the intermediate housing and the lower housing and surrounding a rotor outside the rotor.

A first locking portion or a second locking portion protruding toward or recessed inside the first fixed ring or the second fixed ring may be formed at an upper end or a lower end of the magnet, the stator may include a stator core and a coil wound on the stator core, and the stator core may be formed between a lowermost end of the upper end of the magnet and an uppermost end of the lower end of the magnet.

Advantageous Effects

According to the rotor for a motor and a motor including the rotor of the present invention, there is an effect that the magnet is fixed at the upper portion and the lower portion to rotate with the shaft and damage to the magnet due to centrifugal force by high-speed rotation is prevented.

In particular, there is an effect that a possibility of damage to the magnet due to stress concentration between opposite poles of the magnet is reduced.

Further, there is an effect that vibration of the shaft due to deformation according to the circumferential positions of the magnet, the first fixed ring, and the second fixed ring is minimized.

MODE FOR INVENTION

Figure 1:
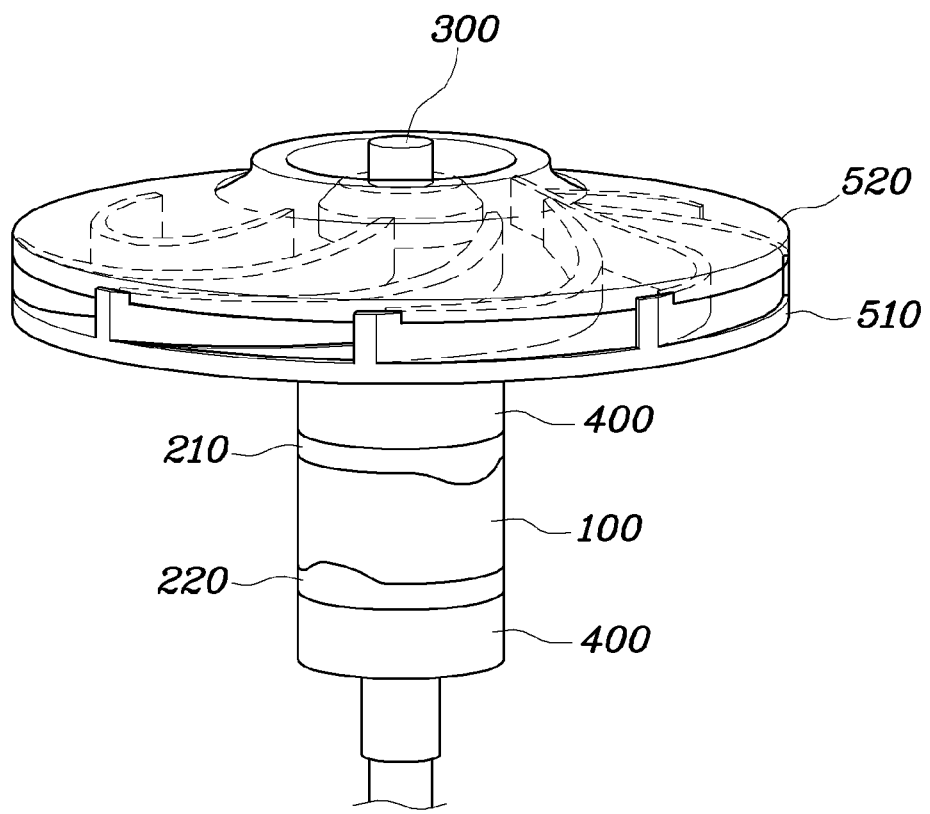
FIG. 1 shows a rotor for a motor according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all modifications, equivalents, and substitutions are included in the scope and spirit of the present invention.

It will be understood that, although the terms first and/or second, etc. may be used herein to describe various components, these components should not be limited by these terms. These terms are only used to distinguish one element, from another element. For instance, a first element discussed below could be termed a second element without departing from the right range of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

The present invention will be described hereafter in detail by describing exemplary embodiments of the present invention with reference to the accompanying drawings. Like reference numerals given in the drawings indicate like components.

Figure 2:
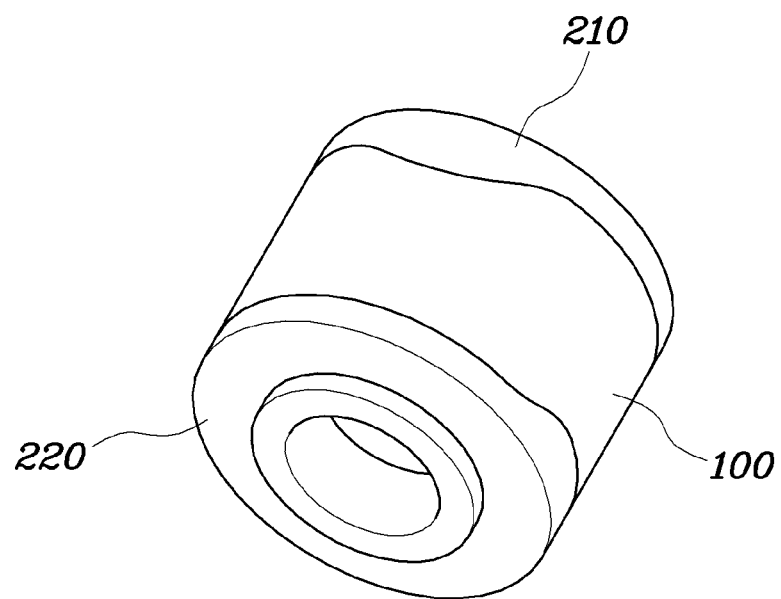
FIG. 2 shows a combined state of a first fixed ring, a second fixed ring, and a magnet of the rotor for a motor according to an embodiment of the present invention.
Figure 3:
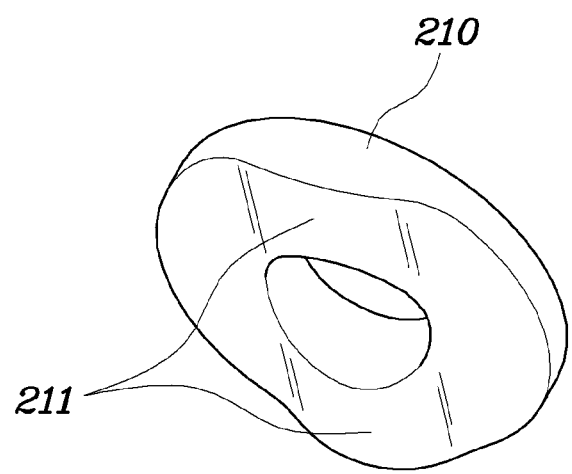
FIG. 3 shows the first fixed ring of the rotor for a motor according to an embodiment of the present invention.
Figure 4:
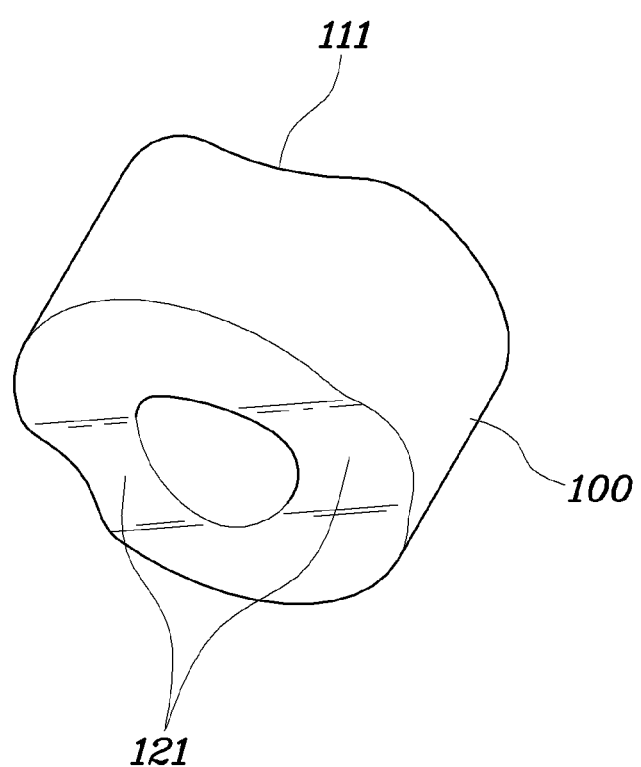
FIG. 4 shows the magnet of the rotor for a motor according to an embodiment of the present invention.

FIG. 1 shows a rotor for a motor according to an embodiment of the present invention, FIG. 2 shows a combined state of a first fixed ring 210, a second fixed ring 220, and a magnet 100 of the rotor for a motor according to an embodiment of the present invention, FIG. 3 shows the first fixed ring 210 of the rotor for a motor according to an embodiment of the present invention, and FIG. 4 shows the magnet 100 of the rotor for a motor according to an embodiment of the present invention.

Referring to FIGS. 1 to 4, a rotor for a motor according to an embodiment of the present invention includes: a magnet 100 coupled to a shaft 300 to surround the outer surface of the shaft 300 and having opposite-polar magnetic portions circumferentially alternately arranged; a first fixed ring 210 fixed to the shaft 300 to surround the outer surface of the shaft 300, disposed in contact with the upper portion of the magnet 100, and having a first coupling portion 211 at the lower end being in contact with the top of the magnet 100 to prevent rotation relative to the magnet 100; and a second fixed ring 220 fixed to the shaft 300 to surround the outer surface of the shaft 300, disposed in contact with the lower portion of the magnet 100, and having a second coupling portion 221 at the upper end being in contact with the bottom of the magnet 100 to prevent rotation relative to the magnet 100.

Although an Interior Permanent Magnet (IPM) type inserted in a rotor is exemplified as a permanent magnet in the present invention, the permanent magnet may be a Surface Permanent Magnet (SPM) type that is attached to the surface of a rotor.

The shaft 300 of the rotor may longitudinally extend and particularly may extend out of a motor. When the rotor is an IPM type rotor, the shaft 300 may be made of a magnetic material. Alternatively, when the rotor is an SPM type, the shaft 300 may be made of a nonmagnetic material and a rotor core that forms a magnetic path may be further disposed around the shaft 300.

The magnet 100 has a plurality of connected magnetic portions and magnetic portions having opposite poles N and S may be alternately arranged.

The magnet 100 may be formed in a ring shape with a through-hole at the center. In particular, the magnet 100, as shown in the figures, may have a plurality of integrated magnetic portions.

The fixed ring 210 and the second fixed ring 220 may be fixed to the shaft 300 to surround the outer surface of the shaft 300. The first fixed ring 210 and the second fixed ring 220, similar to the magnet 300, each may be formed in a ring shape with a through-hole to be fitted on the shaft 300.

The bottom of the first fixed ring 210 may be in contact with the top of the magnet 100 and the first coupling portion 211 is formed at the lower end of the first fixed ring 210, so the first fixed ring 210 may be combined with the magnet 100 with relative rotation prevented.

The top of the second fixed ring 220 may be in contact with the bottom of the magnet 100 and the second coupling portion 221 is formed at the upper end of the first fixed ring 210, so the second fixed ring 220 may be combined with the magnet 100 with relative rotation prevented.

Accordingly, the first fixed ring 210 and the second fixed ring 220 are coupled on and under the magnet 100, respectively, without relative rotation, so the magnet 100 can rotate with the shaft 300. Accordingly, there is an effect that it is possible to prevent damage due to centrifugal force by high-speed rotation of the shaft 300 even without coupling a separate can outside the magnet 100.

The first coupling portion 211 or the second coupling portion 221 may protrude toward the magnet 100 or may be recessed inside the first fixed ring 210 or the second fixed ring 220. A first locking portion 111 or a second locking portion 121 that is recessed or protruded to correspond to the shape of the first coupling portion 211 or the second coupling portion 221 to be locked to the first coupling portion 211 or the second coupling portion 221 may be formed at the upper end or the lower end of the magnet 100.

As shown in the figures, according to an embodiment of the present invention, the first coupling portion 211 and the second coupling portion 221 of the first fixed ring 210 and the second fixed ring 220 may protrude toward the magnet 100, and the first locking portion 111 and the second locking portion 121 may be recessed inside the magnet 100. Alternately, the first locking portion 111 and the second locking portion 121 may protrude toward the first fixed ring 210 and the second fixed ring 220, and the first coupling portion 211 and the second coupling portion 221 may be recessed.

The first locking portion 111, second locking portion 121, first coupling portion 211, and second coupling portion 221 each may be one or more pieces.

The protruding portions are referred to as protrusions P and the recessed portions are referred to as supports S. The maximum widths of the protrusions P and the supports S may be ½ or less of the diameter of the magnet 100, the first fixed ring 210, or the second fixed ring 220. The maximum heights of the protrusions P and the supports S may be ¼ or less of the diameter of the magnet 100, the first fixed ring 210, or the second fixed ring 220.

The first coupling portion 211, second coupling portion 221, first locking portion 111, and second locking portion 121 may radially extend from the center of the shaft 300.

The first locking portion 111 may be locked to the first coupling portion 211 and the second locking portion 121 may be locked to the second coupling portion 221. Accordingly, the first fixed ring 210 and the second fixed ring 220 can be rotated with the magnet 100 over and under the magnet 100 without rotating relatively to the magnet 100.

In particular, the first coupling portion 211 and the first locking portion 111 may be formed in corresponding shapes to be in surface contact with each other, and the second coupling portion 221 and the second locking portion 121 may also be formed in corresponding shapes to be in surface contact with each other.

The first coupling portion 211 and the first locking portion 111 or the second coupling portion 221 and the second locking portion 121 may be formed as curved surfaces connected such that the inclination is continuously changed.

The first coupling portion 211 and the first locking portion 111 or the second coupling portion 221 and the second locking portion 121 each may have a curved surface inclined upward or downward, and the curved surfaces may be connected such that the inclination is continuously changed. For example, the inclination of the curved surfaces may be expressed by a continuous tangent function.

Accordingly, stress partially concentrated on the magnet 100, the first fixed ring 210, and the second fixed ring 220 is minimized, whereby there is an effect that damage to the magnet 100, the first fixed ring 210, and the second fixed ring 220 is prevented.

In particular, the inner diameters of the first fixed ring 210 and the second fixed ring 220 are the same as or smaller than the outer diameter of the shaft 300, so the fixed rings can be forcibly fitted on the shaft 300. That is, the first fixed ring 210 and the second fixed ring 220 can be fixed to the shaft 300 by being forcibly fitted on the shaft 300, whereby the fixed rings can be rotated with the shaft 300.

On the other hand, the inner diameter of the magnet 100 may be the same as or larger than the outer diameter 300, so the shaft 300 can pass through the magnet 100. The magnet 100 should also be fixed to and rotated with the shaft 300, but the magnet may be made of a less rigid material than the first fixed ring 210 and the second fixed ring 220. Accordingly, the inner diameter of the magnet 100 may be the same as or larger than the outer diameter of the shaft 30 and may be combined with the shaft in a partial contact state.

Accordingly, the magnet 100 can be rotated with the first fixed ring 210 and the second fixed ring 220 over and under the magnet 100 and can be fixed to the shaft 300 even without being forcibly fitted on the shaft 300. Accordingly, it is possible to reduce the possibility of damage due to fitting the shaft 300 through the magnet 100.

The first coupling portion 211 and the second coupling portion 221 are formed to correspond to the numbers of the opposite-polar magnetic portions of the magnet 100, respectively, and may be circumferentially alternately arranged.

For example, when the magnet 100 has two N-polar magnetic portions and two S-polar magnetic portions, the first coupling portion 211 and the second coupling portion 221 each may be formed as two pieces. In particular, N-poles and S-poles may be circumferentially alternately arranged at the magnet 100, and the first coupling portion and the second coupling portion 221 may be circumferentially alternately arranged.

In particular, pluralities of first coupling portions 211 and second coupling portions 221 may be arranged with regular intervals. When two first coupling portions 211 and two second coupling portions 221 are provided, they may be each arranged with regular intervals of 180 degrees around the shaft 300. When there are three first coupling portions 211 and three second coupling portions 221, they each may be arranged with regular intervals of 120 degrees.

As another embodiment, the first coupling portion 211 and the second coupling portion 221 may be formed as much as N times (N is a natural number) the numbers of opposite-polar magnetic portions of the magnet 100, respectively, or the numbers of the opposite-polar magnetic portions of the magnet 100 may be N times (N is a natural number) the first coupling portion 211 and the second coupling portion 221, respectively.

In more detail, the boundary between the opposite-polar magnetic portions may be positioned between the first coupling portion 211 and the second coupling portion 221.

The magnet 100 having alternate N-pole and S-pole is usually damaged at a transition section including the boundary between the N-pole and the S-pole due to concentration of stress.

Accordingly, the boundary between the opposite-polar magnetic portions may be positioned between the first coupling portion 211 and the second coupling portion 221 to avoid the first coupling portion 211 and second coupling portion 221 and the first locking portion 111 and second locking portion 121 having shapes corresponding to the first and second coupling portions.

Accordingly, the transition section including the boundary between the opposite-polar magnetic portions can secure a sufficient height between the alternate first coupling portion 211 and the second coupling portion 221, whereby there is an effect that the possibility of damage is reduced.

In particular, the first coupling portion 211 and the second coupling portion 221 may be formed at the centers of the opposite-polar magnetic portions, respectively.

For example, the first coupling portion 211 may be formed at the center of the N-polar magnetic portion and the second coupling portion 221 may be formed at the center of the S-polar magnetic portion. Further, the boundary between the N-polar magnetic portion and the S-polar magnetic portion positioned at the center of the N-polar magnetic portion and the S-polar magnetic portion may be formed between the first coupling portion 211 and the second coupling portion 221.

Accordingly, the transition section including the boundary between the opposite-polar magnetic portions can secure a sufficient height between the alternate first coupling portion 211 and the second coupling portion 221, whereby there is an effect that the possibility of damage is reduced.

Figure 5:
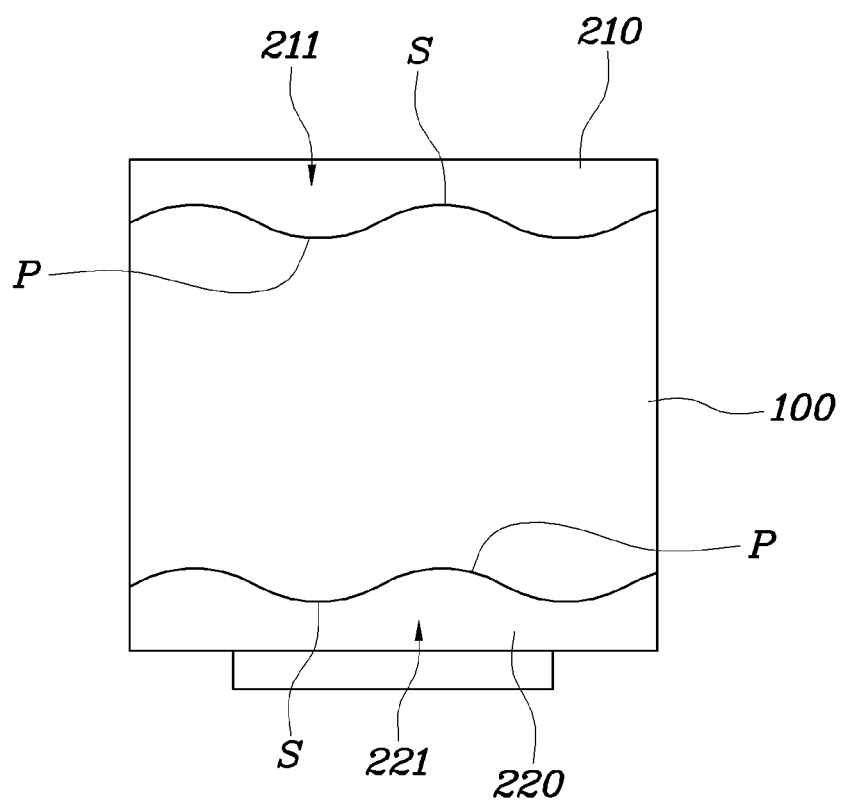
FIG. 5 shows a combined state of a first fixed ring, a second fixed ring, and a magnet of a rotor for a motor according to another embodiment of the present invention.

FIG. 5 shows a combined state of a first fixed ring 210, a second fixed ring 220, and a magnet 100 of a rotor for a motor according to another embodiment of the present invention.

Referring to FIG. 5, a protrusion P protruding from the first fixed ring 210 or the second fixed ring 220 and a support S recessed inside the first fixed ring 210 or the second fixed ring are alternately disposed at each of the first coupling portion 211 and the second coupling portion 221. The protrusion P of the first coupling portion 211 may be positioned to circumferentially correspond to the support S of the second coupling portion 221 and the support S of the first coupling portion 221 may be positioned to circumferentially correspond to the protrusion P of the second coupling portion 221.

The first coupling portion 211 and the second coupling portion 221 may be formed as a protrusion P or a support S. In particular, as in this embodiment, a protrusion P and a support S may be alternately arranged.

A first locking portion 111 and a second locking portion 121 may be formed at the upper end and the lower end of the magnet 100 to correspond to the shapes of the first coupling portion 211 and the second coupling portion 221, respectively. The first locking portion 111 and the second locking portion 121 each may also have a support S and a protrusion P that are alternately arranged to correspond to the shapes of the first coupling portion 211 and the second coupling portion 221.

In particular, the support S of the second coupling portion 221 may be formed at the circumferential position where the protrusion P of the first coupling portion 211 is formed, and a support S may be formed at the circumferential position where the protrusion P of the first coupling portion 211 is formed.

Accordingly, a support S is formed at the lower end at the position where a protrusion P is formed at the upper end of the magnet 100 and a protrusion P is formed at the lower end where a support S is formed at the upper end, whereby the difference of centrifugal force at radial positions is minimized by the protrusions P and the supports S and there is an effect that vibration of the shaft 300 is reduced.

In particular, the first locking portion 111 and the second locking portion 121 respectively corresponding to the first coupling portion 211 and the second coupling portion 221 are formed at the upper end and the lower end of the magnet 100, and the height of the magnet 100 may be circumferentially maintained at a predetermined level.

Accordingly, the mass distribution of the magnet 100 is circumferentially uniform, so there is an effect that vibration of the shaft 300 is removed.

As another embodiment, the first fixed ring 210 and the second fixed ring 220 may be made of a material having the same density as that of the magnet 100.

The magnet 100 may be made of a neodymium-based material, and the first fixed ring 210 and the second fixed ring 220 may be made of a copper-based or aluminum-based nonmagnetic material.

When the densities of the first fixed ring 210 and the second fixed ring 220 are the same as the density of the magnet 100, mass distribution is radially uniform even though the first coupling portion 211 and the second coupling portion 221 are formed, so there is an effect that vibration of the shaft 300 can be minimized.

Figure 6:
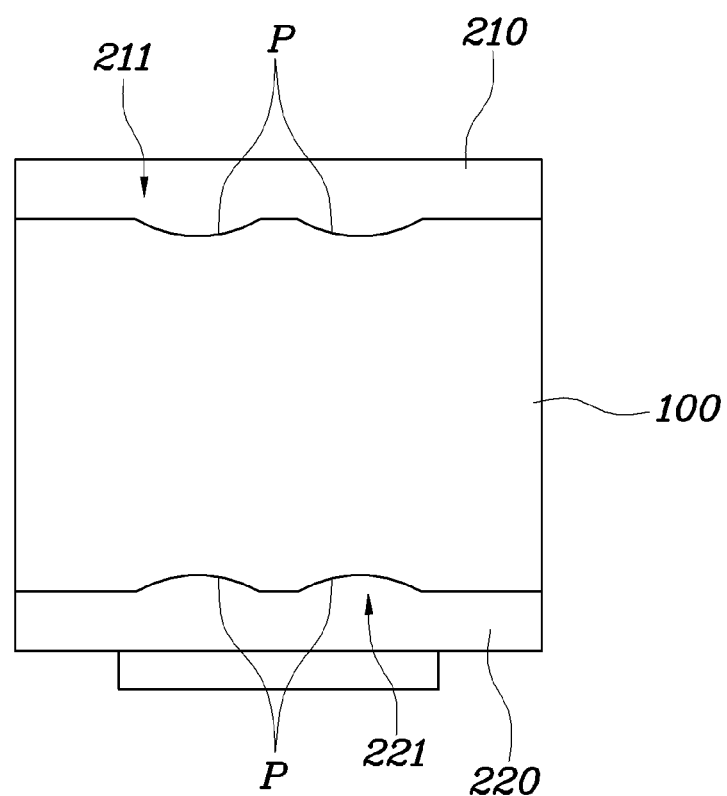
FIG. 6 shows a combined state of a first fixed ring, a second fixed ring, and a magnet of a rotor for a motor according to another embodiment of the present invention.

FIG. 6 shows a combined state of a first fixed ring 210, a second fixed ring 220, and a magnet 100 of a rotor for a motor according to another embodiment of the present invention.

Referring to FIG. 6, the first coupling portion 211 or the second coupling portion 221 may be formed by connecting a plurality of spaced protrusions P protruding toward the magnet 100 or a plurality supports S recessed inside the first fixed ring 210 or the second fixed ring 220.

As shown in the figure, the first coupling portion 211 and the second coupling portion 221 may be formed by connecting a plurality of protrusions P protruding toward the magnet 100. Accordingly, there is an effect that the first fixed ring 210, the second fixed ring 220, and the magnet 100 are more firmly assembled.

In particular, the protrusions P or supports S of the first coupling portion 211 and the second coupling portion 221 each may be connected to each other such that the inclination is continuously changed. In detail, there is a point with a radial inclination of 0 between the protrusions P or the supports S. Accordingly, there is an effect that stress concentration is minimized.

Figure 7:
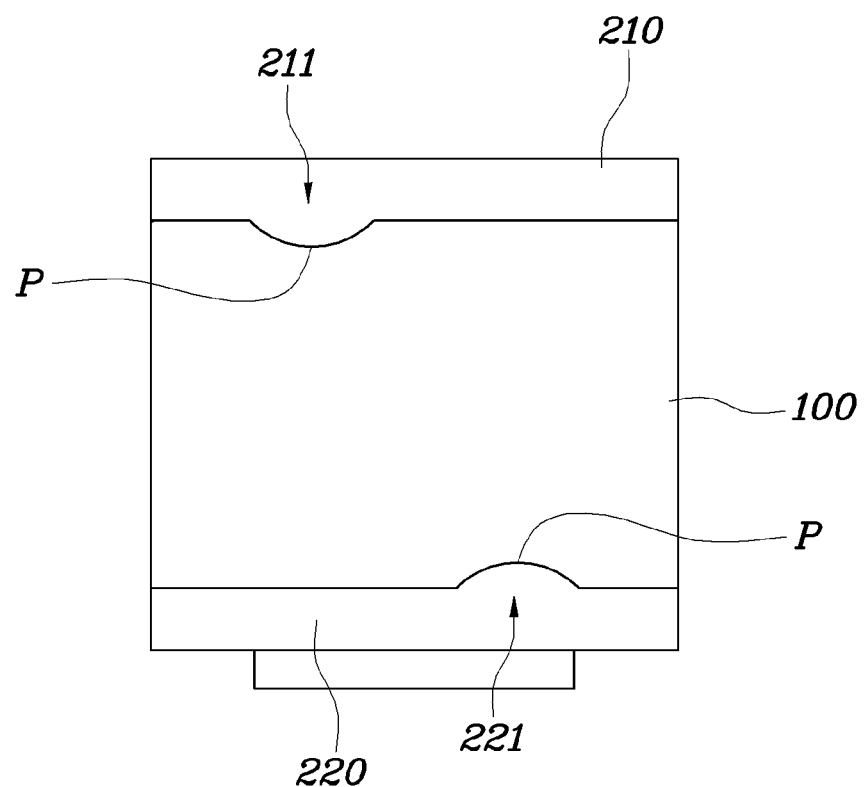
FIG. 7 shows a combined state of a first fixed ring, a second fixed ring, and a magnet of a rotor for a motor according to another embodiment of the present invention.

FIG. 7 shows a combined state of a first fixed ring 210, a second fixed ring 220, and a magnet 100 of a rotor for a motor according to another embodiment of the present invention.

Referring to FIG. 7, protrusions P or supports S protruding from the first fixed ring 210 or the second fixed ring 220 may be alternately formed at the first coupling portion 211 and the second coupling portion 221, respectively.

In detail, a protrusion P or a support S of the first fixed ring 210 and a protrusion P or a support S of the second fixed ring 220 are circumferentially spaced apart from each other, so the first coupling portion 211 and the second coupling portion 221 may be alternately arranged.

In particular, the first coupling portion 211 may be formed at the position where a protrusion P or a support S is formed at the first fixed ring 210, and the magnet 100 and the second fixed ring 200 may extend as parallel planes at the position where the first coupling portion 211 is formed.

On the other hand, the second coupling portion 221 is formed to circumferentially avoid the position where the first coupling portion 211 is formed, and the magnet 100 and the first fixed ring 210 may extend as parallel planes at the position where the second coupling portion 221 is formed.

Figure 8:
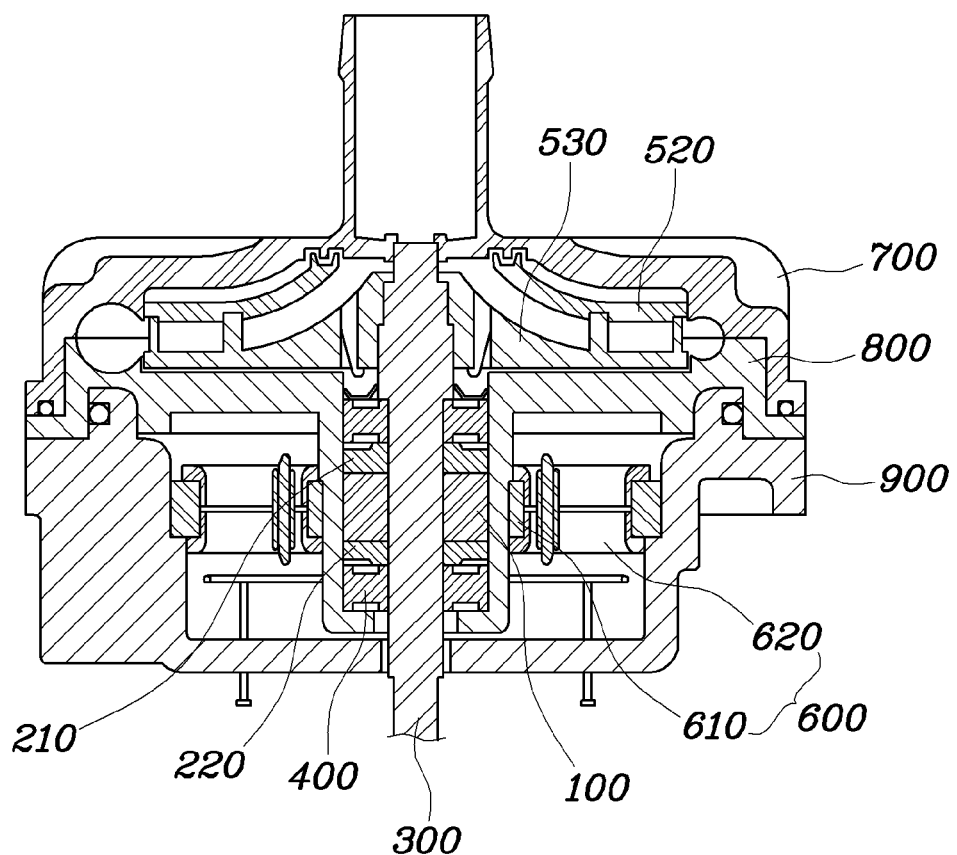
FIG. 8 shows the inside of a motor including a rotor for a motor according to an embodiment of the present invention.

FIG. 8 shows the inside of a motor including a rotor for a motor according to an embodiment of the present invention.

Referring to FIG. 8, a motor including a rotor for a motor according to an embodiment of the present invention may further include: an intermediate housing 800 spaced apart from the magnet 100 and surrounding the outer side of the magnet 100; an upper housing 700 covering the upper portion of the intermediate housing 800 and coupled to the intermediate housing 800; a lower housing 900 disposed outside the intermediate housing 800, surrounding the intermediate housing 800 to form an internal space therebetween, and coupled to the intermediate housing 800 or the upper housing 700; and a stator 600 disposed in the space between the intermediate housing 800 and the lower housing 900 and surrounding a rotor outside the rotor.

The motor includes the upper housing 700 covering the rotor and the stator 600 over them and the lower housing 900 covering the rotor and the stator 600 under them. Further, a shaft 300 may extend to be exposed through the upper housing 700 or the lower housing 900.

The intermediate housing 800 may be further included between the upper housing 700 and the lower housing 900. The rotor may be disposed between the intermediate housing 800 and the upper housing 700.

In particular, an impeller upper-part 520 and an impeller lower-part 510 may be disposed between the upper housing 700 and the intermediate housing 800, and the shaft 300 may pass through the parts. A magnet 100, a first fixed ring 210, and a second fixed ring 220 may be fitted on the shaft 300 in the extension direction of the shaft 300 in the internal space surrounded by the intermediate housing 800.

The magnet 100, the first fixed ring 210, and the second fixed ring 220 may be fixed to the shaft 300 and may be partially spaced apart from the intermediate housing 800. A bearing 400 is further included between the shaft 300 and the intermediate housing 800 and can support relative rotation between the shaft 300 and the intermediate housing 800.

The stator 600 may be disposed in the space between the intermediate housing 800 and the lower housing 900. In particular, it may surround the outer side of the rotor surrounded by the intermediate housing 800.

In particular, the stator 600 may include a stator core 610 and a coil 620 wound on the stator core 610. The present invention may be applied to a BLDC motor and the stator 600 may be a permanent magnet because the coil 620 is wound on the stator core 610. The stator core 610 may be configured such that a plurality of sheets is stacked.

A first locking portion 111 or a second locking portion 121 protruding toward or recessed inside the first fixed ring 210 or the second fixed ring 220 may be formed at the upper end or the lower end of the magnet 100, and the stator core 610 may be formed between the lowermost end of the upper end of the magnet 100 and the uppermost end of the lower end of the magnet 100.

That is, the stator core 610 may be smaller than the height of the magnet 100 protruding or recessed upward or downward, and particularly, may be formed to surround the outer side of the magnet 100 between the lowermost end of the upper end of the magnet 100 and the uppermost end of the lower end of the magnet 100.

Accordingly, since the magnet 100 is protruded or recessed upward or downward, there is an effect that a radial difference of torque generated by a magnetic field is minimized.

Although the present invention was described with reference to specific embodiments shown in the drawings, it is apparent to those skilled in the art that the present invention may be changed and modified in various ways without departing from the scope of the present invention which is described in the following claims.

DESCRIPTION OF THE REFERENCE
NUMERALS IN THE DRAWINGS

| | |
|---|---|
| 100: magnet | 210: first fixed ring |
| 211: first coupling portion | 220: second fixed ring |
| 221: second coupling portion | 300: shaft |
| 400: bearing | 600: stator |
| 620: stator core | 620: coil |
| 700: upper housing | 800: intermediate housing |
| 900: lower housing | |

The invention claimed is:
1. A rotor for a motor, comprising:
a magnet coupled to a shaft to surround an outer surface of the shaft and having opposite-polar magnetic portions circumferentially alternately arranged;
a first fixed ring fixed to the shaft to surround an outer surface of the shaft, disposed in contact with an upper portion of the magnet, and having a first coupling portion at a lower end being in contact with a top of the magnet to prevent rotation relative to the magnet; and a second fixed ring fixed to the shaft to surround the outer surface of the shaft, disposed in contact with a lower portion of the magnet, and having a second coupling portion at an upper end being in contact with a bottom of the magnet to prevent rotation relative to the magnet, wherein a protrusion protruding from the first fixed ring or the second fixed ring and a support recessed inside the first fixed ring or the second fixed ring are alternately disposed at each of the first coupling portion and the second coupling portion, the protrusion of the first coupling portion is positioned to circumferentially correspond to the support of the second coupling portion, and the support of the first coupling portion is positioned to circumferentially correspond to the protrusion of the second coupling portion.

2. The rotor of claim 1, wherein the first coupling portion or the second coupling portion protrudes toward the magnet or is recessed inside the first fixed ring or the second fixed ring, and a first locking portion or a second locking portion recessed or protruding to correspond to a shape of the first coupling portion or the second coupling portion and locked to the first coupling portion or the second coupling portion is formed at an upper end or a lower end of the magnet.

3. The rotor of claim 2, wherein the first coupling portion and the first locking portion or the second coupling portion and the second locking portion are formed as curved surfaces connected such that an inclination is continuously changed.

4. The rotor of claim 1, wherein the first coupling portion and the second coupling portion are formed to correspond to the numbers of opposite-polar magnetic portions of the magnet, respectively, and are circumferentially alternately arranged.

5. The rotor of claim 4, wherein a boundary between the opposite-polar magnetic portions is positioned between the first coupling portion and the second coupling portion.

6. The rotor of claim 4, wherein the first coupling portion and the second coupling portion are formed at centers of the opposite-polar magnetic portions, respectively.

7. The rotor of claim 1, wherein a first locking portion and a second locking portion respectively corresponding to the first coupling portion and the second coupling portion are formed at an upper end or a lower end of the magnet, and a height of the magnet is circumferentially maintained at a predetermined level.

8. The rotor of claim 1, wherein inner diameters of the first fixed ring and the second fixed ring are the same as or smaller than an outer diameter of the shaft, and the first fixed ring and the second fixed ring are forcibly fitted on the shaft.

9. The rotor of claim 1, wherein an inner diameter of the magnet is the same as or larger than an outer diameter of the shaft, and a shaft passes through the magnet.

10. The rotor of claim 1, wherein the first fixed ring and the second fixed ring are made of a material having the same density as the magnet.

11. A motor including the rotor for a motor of claim 1, the motor comprising:

an intermediate housing spaced apart from the magnet and surrounding an outer side of the magnet;

an upper housing covering an upper portion of the intermediate housing and coupled to the intermediate housing;

a lower housing disposed outside the intermediate housing, surrounding the intermediate housing to form an internal space therebetween, and coupled to the intermediate housing or the upper housing; and a stator disposed in the space between the intermediate housing and the lower housing and surrounding a rotor outside the rotor.

12. The motor of claim 11, wherein a first locking portion or a second locking portion protruding toward or recessed inside the first fixed ring or the second fixed ring is formed at an upper end or a lower end of the magnet, the stator includes a stator core and a coil wound on the stator core, and the stator core is formed between a lowermost end of the upper end of the magnet and an uppermost end of the lower end of the magnet.

13. A rotor for a motor, comprising:

a magnet coupled to a shaft to surround an outer surface of the shaft and having opposite-polar magnetic portions circumferentially alternately arranged;

a first fixed ring fixed to the shaft to surround an outer surface of the shaft, disposed in contact with an upper portion of the magnet, and having a first coupling portion at a lower end being in contact with a top of the magnet to prevent rotation relative to the magnet; and a second fixed ring fixed to the shaft to surround the outer surface of the shaft, disposed in contact with a lower portion of the magnet, and having a second coupling portion at an upper end being in contact with a bottom of the magnet to prevent rotation relative to the magnet, wherein the first coupling portion or the second coupling portion is formed by connecting a plurality of spaced protrusions protruding toward the magnet or a plurality of supports recessed inside the first fixed ring or the second fixed ring.

\* \* \* \* \*